United States Patent
Brun et al.

(10) Patent No.: US 9,036,924 B2
(45) Date of Patent: May 19, 2015

(54) METHOD FOR AUTOMATICALLY CLASSIFYING A TWO-OR HIGHER-DIMENSIONAL IMAGE

(75) Inventors: Anders Brun, Stocksund (SE); Zihan Hans Liu, Stockholm (SE); Anders Wästfelt, Hägersten (SE); Bo Malmberg, Uppsala (SE); Michael Nielsen, Farsta (SE)

(73) Assignee: Choros Cognition AB, Hagersten (SE)

( * ) Notice: Subject to any disclaimer, the term of this patent is extended or adjusted under 35 U.S.C. 154(b) by 254 days.

(21) Appl. No.: 13/821,606

(22) PCT Filed: Sep. 9, 2011

(86) PCT No.: PCT/SE2011/051095
§ 371 (c)(1),
(2), (4) Date: May 20, 2013

(87) PCT Pub. No.: WO2012/033460
PCT Pub. Date: Mar. 15, 2012

(65) Prior Publication Data
US 2013/0230257 A1    Sep. 5, 2013

(30) Foreign Application Priority Data

Sep. 10, 2010 (SE) .................................. 1050937

(51) Int. Cl.
*G06K 9/62*    (2006.01)
*G06K 9/00*    (2006.01)

(52) U.S. Cl.
CPC .......... *G06K 9/00664* (2013.01); *G06K 9/6223* (2013.01)

(58) Field of Classification Search
CPC ...................................................... G06K 9/62
USPC ........................................ 382/159, 224, 226
See application file for complete search history.

(56) References Cited

U.S. PATENT DOCUMENTS

| 7,706,612 | B2 * | 4/2010 | Luo ............................... 382/181 |
| 8,781,216 | B2 * | 7/2014 | Malmberg et al. ............ 382/154 |
| 2008/0137954 | A1 | 6/2008 | Tang et al. |
| 2008/0172185 | A1 * | 7/2008 | Yi et al. .......................... 702/21 |

FOREIGN PATENT DOCUMENTS

| WO | 02067143 | 8/2002 |
| WO | 2008118977 | 10/2008 |
| WO | 2010104462 | 9/2010 |

OTHER PUBLICATIONS

International Search Report dated Dec. 14, 2011, corresponding to PCT/SE2011/051095.
N. Tran, et al.; Clustering Multispectral Images: A Tutorial, Chemometrics and Intelligent Laboratory Systems, May 28, 2005, Elsevier Science Publishers B.V. Amsterdam, NL. vol. 77, p. 3-17.

* cited by examiner

*Primary Examiner* — Gregory M Desire
(74) *Attorney, Agent, or Firm* — Young & Thompson

(57) ABSTRACT

Method for classifying a two- or higher dimensional image, where each pixel is associated with M property measures, includes identifying firstly a certain predetermined, variable geometric structure, the extension of which in at least two of the N dimensions in the dataset is determined in relation to a single element in the dataset and by at least one variable parameter, and secondly at least one geometric measure associated with the variable geometric structure, which geometric measure is arranged to measure a geometric property of a specific geometric structure in relation to other specific such geometric structures, and in that a main classification is conducted of the dataset, which main classification is based upon a comparative measure between the respective sets of associated geometric measures of two elements, calculated from a respective maximal geometric structure for each element.

16 Claims, 19 Drawing Sheets

METHOD FOR AUTOMATICALLY CLASSIFYING A TWO-OR HIGHER-DIMENSIONAL IMAGE

The present invention relates to the automatic classification of image information.

Various imaging techniques in two or more dimensions are now central within many fields of technology. For example, satellite images are used as originals or in processed form for mapping, in demographic, economic and environmental analyses, as well as within community planning. Three-dimensional images are for instance achieved through various medical imaging techniques, and are used to analyze the human body, as support for surgeons during surgery, and so forth, but also within for example the nanotechnological field. Collected image data is analyzed and used in numerous applications to control the behavior of robots and other technical equipment, with the aim of navigating through space, selecting and handling objects and interacting with other technology as well as with human beings. Furthermore, two-dimensional imaging techniques are used within microscopy. Images with spatial as well as temporal dimensions are for instance used within the field of medicine, where a heart for example can be depicted across both the three spatial dimensions as well as two circular, temporal dimensions representing the heart- and lung cycles.

In general, the information contained in such an image requires interpretation before use. The goal of such interpretation is typically to identify the structural components in the image, such as an object against a background; different fields that are delimited one to another or volumes of different color intensity, structure or which are distinct as compared to each other in other ways; or deviating elements. Examples include identifying roads, housing, forest, farm land, etc. from satellite images; distinguishing faces in a photography depicting human beings; separating various types of tissue in a three-dimensional MR image of a person; and identification of material deviations based upon a photography of a manufactured detail.

It is often for time reasons desirable to achieve an automatic interpretation of an image. One way to carry out such interpretation starts out from a digital image in two or more dimensions, built up from a number of individual pixels. Each pixel is then associated with one certain respective class of pixels, selected among a number of such classes designed to represent a certain pixel type. When all pixels have been associated with a respective class, an inventory can be made of each class, so as to obtain a collected picture of where in the image pixels of a certain type occur. Herein, such method is denoted a "classification". Hence, a certain class can for example represent "road", "muscle tissue" or "material defect".

Typically, classification techniques are used to locate objects and borders, such as lines, curves, fields, etc., in an image.

Several attempts have been made to achieve a method for automatically performing useful classifications of images where the knowledge of the image contents is limited before the start of the classification.

For instance, a method has been proposed in which a movable "window" is swept across the image in an attempt to classify a pixel located in the centre of the window to a certain class identity by studying the centre pixel's surrounding pixels and using statistical methods (kernel-based segmentation). For some types of images, such methods can be efficient, but the result of the classification is often very scattered, with classes comprising pixels from many different parts of the image. The result is that it is difficult to obtain useful information from the classification without large amounts of manual work.

An automatic classification of an image has also been proposed with parallel consideration to all pixels, in an iterative method (window-independent classification). One example of an algorithm which can be used in such a method is a cluster analysis of K-means type. Even such methods often result in scattered classifications when used to classify digitally stored images.

In the article "Automated Segmentation of MR Images of Brain Tumors", Kaus, Michael R., et al., Radiology 2001; 218:586-591, an iterative classification of a three-dimensional MR-reproduction of a human skull is disclosed. The classification is performed iteratively, with the help of among other things local segmentation strategies and a distance transform which calculates the distance between a certain voxel (a three-dimensional pixel) and a certain class, and also on the basis of information regarding grayscale intensity of the voxels taking part in the reproduction.

The majority of the steps making up such a method must be carried out manually in order to achieve sufficient reliability of the finally classified result. Additionally, a comparatively solid knowledge of the object is required before the classification is started, for example in the form of a comparative image illustrating a "normal case" or the like.

The Swedish patent application with number 0950140-4 describes a method according to which the pixels in an image are first subjected to a first classification, after which the smallest geometric distance between each pixel and a pixel belonging to a certain class is calculated. A second classification is then conducted on the basis of these calculated smallest distances.

The present invention solves the above described problems.

Thus, the invention relates to a method for classifying an image in two or more dimensions, where an N-dimensional dataset comprising elements is caused to represent the image by at least two of the N dimensions constituting respective image axes, so that a certain pixel in the image corresponds to a certain element in the dataset, and by each element being associated with M numerical values each representing a measure of a property of the element in question, whereof at least one property represents image information in one respective sampled channel, and is characterized in that the method comprises identifying firstly a certain predetermined, variable geometric structure, the extension of which in at least two of the N dimensions in the dataset is determined in relation to a single element in the dataset and by at least one variable parameter, and secondly at least one geometric measure associated with the said variable geometric structure, which geometric measure is arranged to measure a geometric property of a specific geometric structure in relation to other specific such geometric structures, and in that the method also comprises the steps that a computer or several interconnected computers a) is or are caused to store the dataset on a digital storage medium; b) for at least each element that corresponds to a pixel in the image, and for at least one of the M element properties, firstly is or are caused to determine a specific geometric structure which may be obtained in relation to the element in question and by choices of parameter value or values, for which specific geometric structure at least one of the said geometric measures is maximal at the same time as it is geometrically limited by individual elements or groups of elements the element property in question of which fulfill a certain predetermined criterion, and secondly is or are caused to calculate at least one of said geometric measures for the said specific geometric structure; c) in a database is or are caused to store an association between each element and the at least one calculated geometric measure for the element for each property for which a specific geometric structure has been calculated in the step b); d) is or are caused to carry out a main classification of the dataset, which main classification is caused to be based upon a comparative measure between the respective sets of associated geometric measures of two elements, whereby each element is caused to be associated with a certain class in a main set of classes; and e) on a digital storage medium is or are caused to store the image classified in the step d) in the form of a set of pixels with the same dimensions as the image, where each pixel is associated with the class in the main set of classes with which the element corresponding to the pixel in the image has been associated in the step d); and in that the said variable geometric structure, measure and criterion are not selected so that the measure calculated in the step b) only constitutes a measure of the smallest distance between the element in question and the closest element which is associated with the element property in question.

In the following, the invention will be described in detail, with reference to exemplifying embodiments of the invention and to the appended drawings, where:

Figure 1:
FIG. 1 is a first image in the form of a photographic, digital satellite grayscale image of a partly developed area.

Thus, FIG. 1 is a photographic satellite image with a pixel resolution of 10×10 m of a certain partly developed geographic area. Herein, that the image is "photographic" refers to that it is made by capturing and interpreting light by a image sensor. In other words, the image may be produced by reading of light across one or several wavelength intervals. The image in FIG. 1 is a so called composite image, based upon 5 different spectral bands which then have been converted to grayscale in a way which is conventional as such. The image is stored in digital form on a suitable storage medium in the form of a set of pixels, where each pixel is associated with image information in at least one channel, in this case five channels, for light intensity. In FIG. 1, a two-dimensional image is shown, wherein the pixels are arranged in a two-dimensional coordinate system, and wherein each pixel is associated with a single channel for light intensity (shade of gray). The conversion to grayscale is conducted in order to increase the clarity of the figure. In the below-described embodiments using the image illustrated in FIG. 1, the information of all five channels was used.

It is realized that also images with more than two dimensions, and a light intensity over more channels than two (for example light intensity information stored according to RGB standard), may be used according to the present invention.

It is also realized that the pixel values have been obtained by sampling the light falling in towards the image sensor. Correspondingly, other physical phenomena, such as sound, other types of radiation than electromagnetic, and so forth, can be sampled and presented spatially in the form of an image. This is for example the case for an ultrasound image.

Moreover, according to the invention the image is of such format that it can be represented in the form of, or as a part of, an N-dimensional dataset comprising elements, by at least two of the N dimensions comprising respective axes in the image, so that a certain sampled pixel in the image corresponds to a certain element in the dataset.

Thus, the dataset may have the same dimensionality as the image, whereby each dimension in the dataset corresponds to a respective image axis.

It is also possible that the dataset comprises other dimensions than those describing image axes. For example, it may comprise two or three geometric dimensions as well as at least one temporal dimension, whereby the image is constituted by a two- or three dimensional depiction of a process which is changing along at least one time dimension. This is for instance the case with the above described depiction of a heart in three spatial dimensions as well as two temporal. Also other types of additional dimensions are thinkable, such as a temperature dimension or a dimension describing some other continuous parameter value giving rise to a spatial context relating one element to its neighbors.

Thus, an image may constitute a cut in a dataset, where the position of the image in the dataset along one or several dimensions is constant. It is realized that one and the same three- or higher dimensional dataset may comprise more than one image in the sense of the invention, and also images of different dimensionality. Furthermore, the dataset may of course also include further data which is of no use to the method of the invention.

According to the invention, each element in the dataset is furthermore associated with M numerical values, each representing a numeric measure of a property for the element in question, whereof at least one property represents image information in one respective sampled channel according to the above.

Thus, the dataset has an outer dimensionality of N and an inner dimensionality of M.

Hence, the image may for instance comprise a two-dimensional photographic image, in which each element comprises image information in at least one channel, each of which specifies light intensity for a certain wavelength spectrum. This is for example the case for a two-dimensional satellite image. Another example is that the image is a three-dimensional depiction of a three-dimensional object, whereby each element comprises image information in at least one channel specifying the value for a material property in the position in the object corresponding to the element in question. This is for instance the case for a three-dimensional magnetic resonance imaging scanned image.

The M numeric values may represent different types of data. Sampled channels can for example comprise one or several channels, such as grayscale data in one channel, which then constitutes a numeric value per element, or RGB coded color values in three channels, which then constitute three numeric values per element.

In addition to sampled image information, for each element one or several of the M properties may also represent spatially localized, a priori given or calculated additional information. Preferred examples of such spatially localized information comprise information about, in the image occurring, edges; areas; calculated or manually identified points of interest and/or data fetched from an external database mapped so that it has the same dimensions as the image, whereby spatially localized information is referenced to individual elements.

Edges, areas etc. may be calculated beforehand using image processing algorithms or -filters which are conventional as such, such as the Harris corner detector and the Sobel operator.

Points of interest may for example be marked by a user, such as a physician marking a specific point representing an interesting area in an X-ray image. Alternatively, various types of additional, spatially oriented data may be collected from external databases. Examples comprise the occurrence of grocery stores or other known points of interest in a satellite image; meteorological data for the ground areas represented in a satellite image; local measurement values for geographic data such a inclination, elevation above sea level and land distribution; demographic data such as population density and land ownership; and the occurrence of a certain spectral mix in a multispectral satellite image, and the occurrence of a certain color in an image.

In order for such additional spatially oriented data to be representable in the form of one or several of the M element properties in the dataset, it is mapped by being transferred to a raster of the same dimensions as the dataset, after which the resulting numeric values are introduced as one or several of the element properties for each element.

It is also preferred that one or several of the M element properties carry numeric information regarding class membership in a set of classes used during an initial classification of the elements of the dataset. In this case, an element property per element may for instance indicate class membership for the element in question by the use of a numeric value. Alternatively, an element property per element and class in said set of classes in the initial classification indicates class membership to the class in question for the element in question. In this case, the class membership may for example be binary, whereby the element in question either belongs to the class or not, or be represented on a sliding scale using a number between 0 and 1, where 0 means no association between the element in question and the class in question, and where 1 means full association. Below, a preferred such initial classification is described in closer detail.

It is preferred that the M element properties are coded as scalar, numeric values. The set of a certain element property for all elements will thereby form a scalar coded information layer, extending across the whole data set. In general, the values may be binary, natural or real, positive and/or negative, depending on what they are arranged to represent.

Moreover, element properties may also represent likelihoods.

It is also self-evident that the M information layers may be mutually overlapping in the sense that several properties for one and the same element may for example be non-zero.

It is desirable to achieve an automatic classification of such images, in order to simply and with high accuracy distinguish between different types of phenomena in the image, such as roads, developed areas, forest, arable land, parks, etc.

Figure 2:
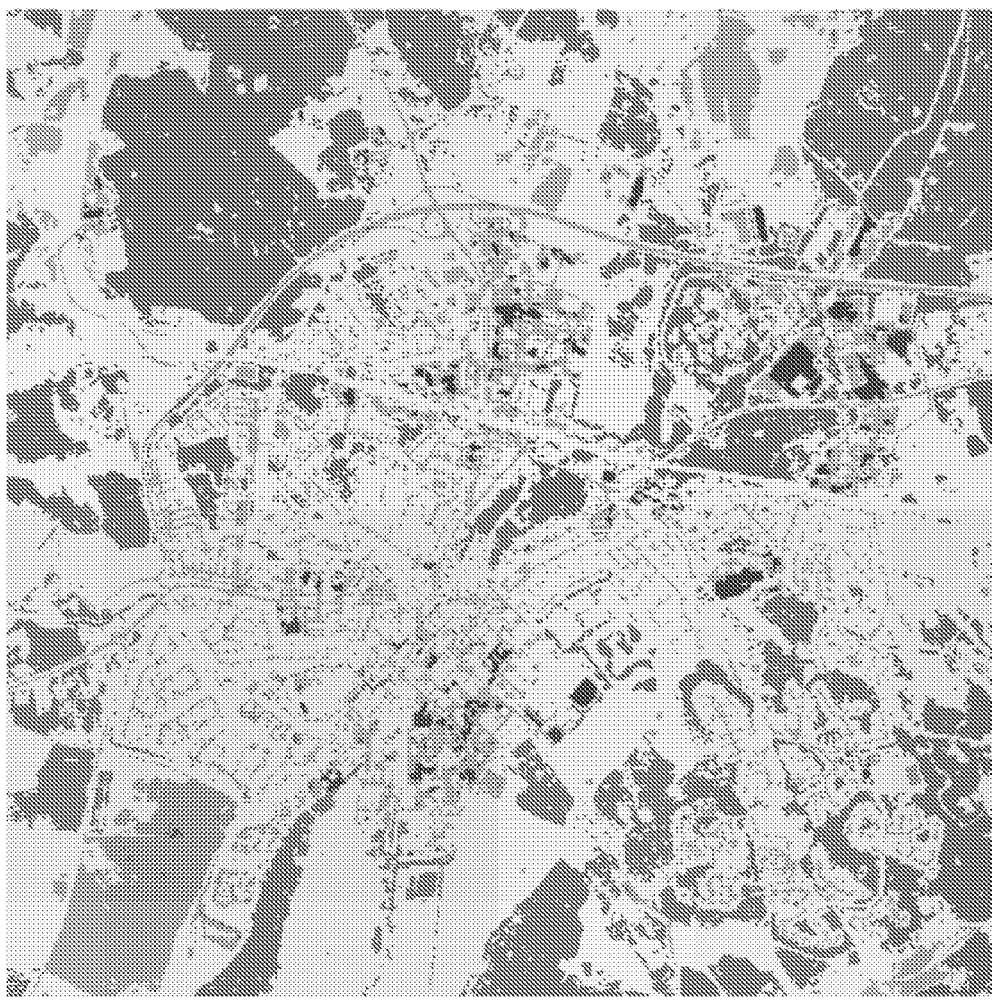
FIG. 2 shows a conventional, kernel based segmentation in five classes for the satellite image illustrated in FIG. 1.

The image shown in FIG. 2 is the same image as that in FIG. 1, but where the image has been processed by a conventional, kernel based segmentation. A window constituted by 5×5 pixels has been swept across the image, and for each pixel the standard deviation has been calculated regarding the light intensity of the pixel in question. Thereafter, these metrics have formed the basis for a conventional classification based upon threshold values, resulting in the illustrated classification. The result is illustrated in FIG. 2, in which different classes are illustrated using different nuances of gray. It is clear from the figure that such a method is successful in finding different classes and in allotting to each pixel an association with a certain specific class. Moreover, many of the pixels constituting various types of terrain, such as for example "road", are grouped in the image shown in FIG. 1 since they are associated with one and the same class. To the contrary, there is a relatively strong noise in the classified image. Too many pixels have been associated with another class than most pixels constituting the same land type in the original image. Therefore, it is difficult to for instance automatically construct a map based upon such a classification.

Figure 3:
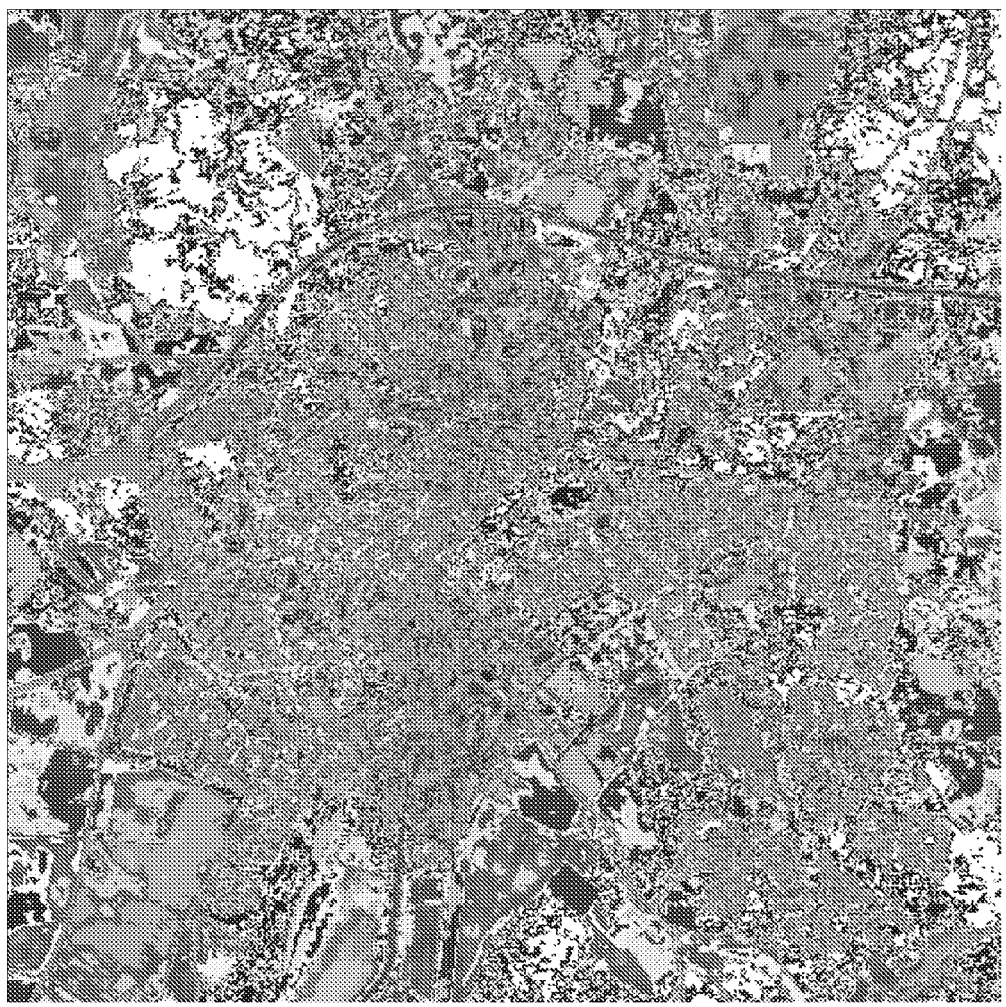
FIG. 3 shows a conventional, window independent classification in twenty-nine classes for the satellite image illustrated in FIG. 1.

FIG. 3 shows, in a way similar to that of FIG. 2, a classification of the image shown in FIG. 1, with the difference that the classification in FIG. 3 is carried out in accordance with a conventional, window independent cluster analysis of K-means type across 29 classes. As is clear from FIG. 3, this classification suffers from the same types of problems as that of FIG. 2.

Figure 16:
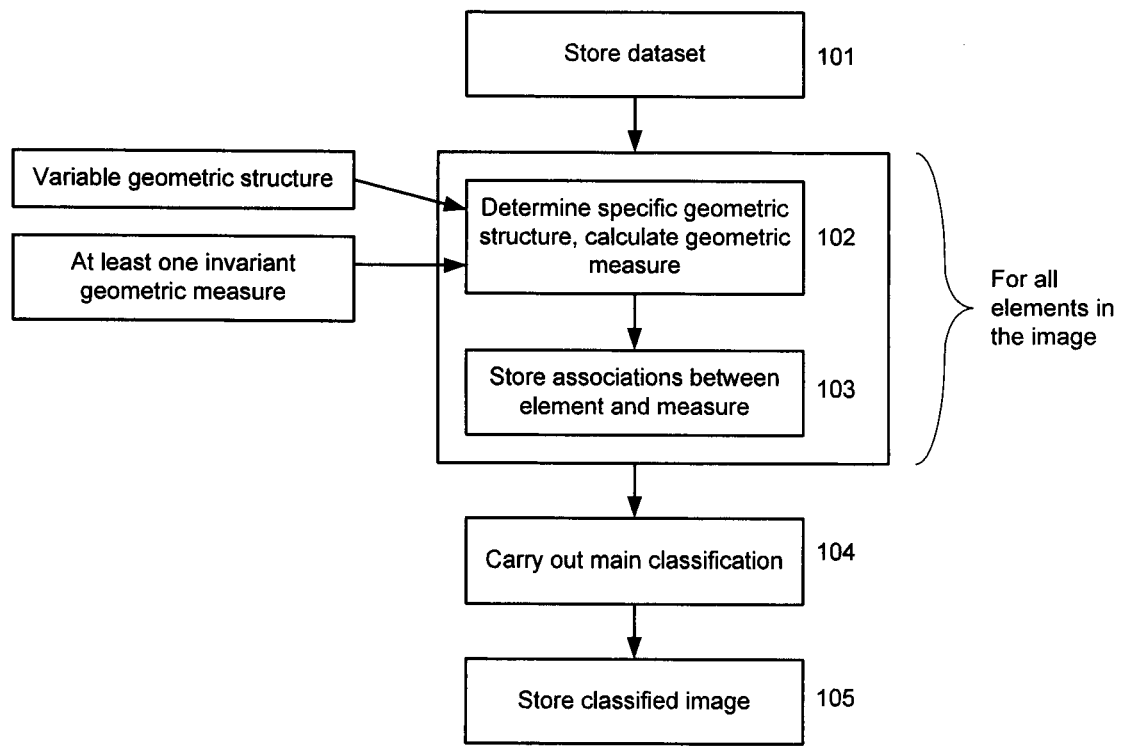
FIG. 16 is a flow chart illustrating a method according to the present invention.

FIG. 16 shows a flow chart illustrating a method according to the present invention.

Thus, according to the invention, in a first step 101, a computer or several interconnected computers are caused to store the dataset digitally on a digital storage medium, in the form of a set of elements with a structure as described above.

According to the invention, for the image to be classified or for a certain category of such images, a certain predetermined, variable geometric structure is identified.

The variable structure is arranged to be extendable in at least two of the N dimensions in the dataset, and may in other words have an extension in at least these two dimensions. It is noted that the variable structure in itself may be of a dimensionality which is lower than the number of dimensions in the dataset over which it may extend, such as for example a one-dimensional line running from one image pixel to another in a two-dimensional image represented by the dataset.

That the variable geometric structure is "variable" is to be interpreted so that its form may be determined unambiguously by the value of at least one variable parameter. Examples of such parameters are the radius of a circle or a sphere, or the radii of an ellipse; the distance of a segment from a centre point; an angle of extension for a certain segment; a centre point or centre point of gravity for the geometric structure; a function describing the periphery of the structure in relation to a fixed point; and so on.

Moreover, the extension of the geometric structure is calculated in relation to a single element in the dataset, in the sense that the individual element constitutes a fixed point of reference in relation to the variable geometric structure. According to a preferred embodiment, the individual element in question is always comprised in or at least surrounded by the variable structure in the cut of the dataset in which the shape of the structure may vary.

It is preferred that the identified, variable geometric structure is used for all elements processed in a method according to the present invention. This will minimize the amount of manual work which must be carried out.

When a variable geometric structure is fixed, by a certain element being selected and by the variable parameter values being selected to specific values, a specific geometric structure is achieved, which in this case hence describes an unambiguous geometric shape in the plane, space or the like.

Furthermore, for the image to be classified or for a certain category of such images, at least one geometric measure associated with the variable geometric structure is determined. The measure is arranged to measure a geometric property of a certain specific geometric structure in relation to other specific such geometric structures. In other words, the measure is arranged to measure the geometric property of a certain specified, fixed instance of the variable geometric structure in relation to other specific such instances of the same variable geometric structure, for which other elements and/or other parameter values have been selected. Using such a measure, different specific structures may thus be compared geometrically to each other.

According to a preferred embodiment, the measure is invariant in terms of pixel resolution of the image, in other words invariant, up to numerical precision, with respect to the sampling of the image. It is also preferred that the measure is invariant under rotation, and also that the measure, or in any case the relation between two measurement values being measured using the same geometric measure, is invariant under scaling of the image. In other words, the measurement value for a specific structure in relation to corresponding measurement values for other specific structures is not changed as a function of scaling and/or rotation of the image. Preferred examples of invariant measures are maximal radius, length, circumference, area, surface area, level of convexity, central moment, center of gravity and/or level of circularity or globularity of the structure. It is also preferred that the measures used are arranged to measure some aspect which is pertaining to the geometric size of the geometric structure.

In a second step 102, the computer or computers are thereafter caused to, for at least each element corresponding to a pixel in the image, preferably for all elements in the dataset, and for at least one of the M element properties, most preferably for all M element properties, firstly determine a specific geometric structure obtainable in relation to the element in question and by selection of parameter value or parameter values. The specific geometric structure which is determined for a certain element is arranged to maximize at least one predetermined geometric measure of the type described above, at the same time as the structure is geometrically delimited by elements occurring in the dataset, the element property of which satisfy a certain predetermined criterion.

FIGS. 4a-4f illustrate, in a principal and simplified way, different ways of determining such specific geometric structures from one certain individual element and a certain element property among the M properties. For reasons of clarity, all examples illustrated in FIGS. 4a-4f relate to two-dimensional images. However, it is realized that for images of higher dimensionality, and possibly also comprising continuous dimensions which do not themselves constitute image axes, the same principles are used for achieving analogous ways of determining specific geometric structures. For example, instead of the circular structure illustrated in FIG. 4a, a three-dimensional sphere may be used, which is allowed to expand up to an element with certain element properties. Correspondingly, a set of three-dimensional, cone-like parts may be used instead of the wedge-shaped parts in FIG. 4b.

Figure 4A:
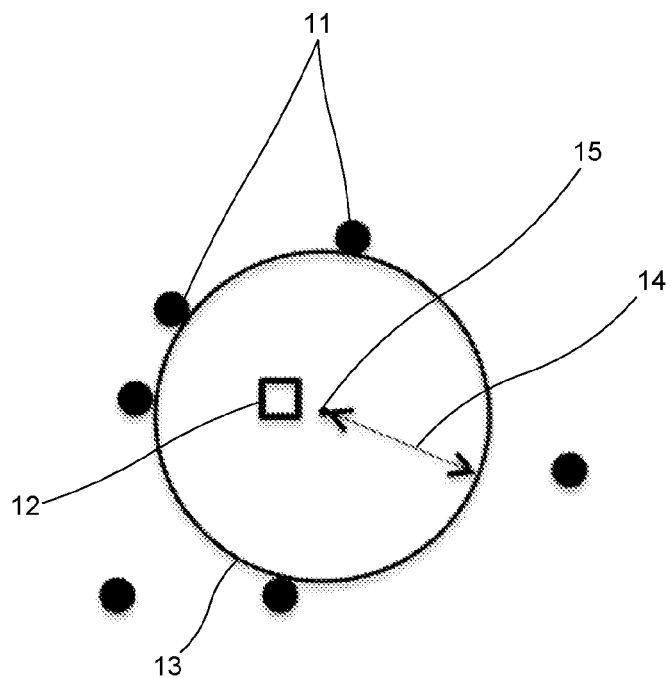
FIGS. 4a, 4b, 4c, 4d, 4e and 4f are outline diagrams illustrating the determination of a specific geometric structure according to different preferred embodiments.
Figure 4B:
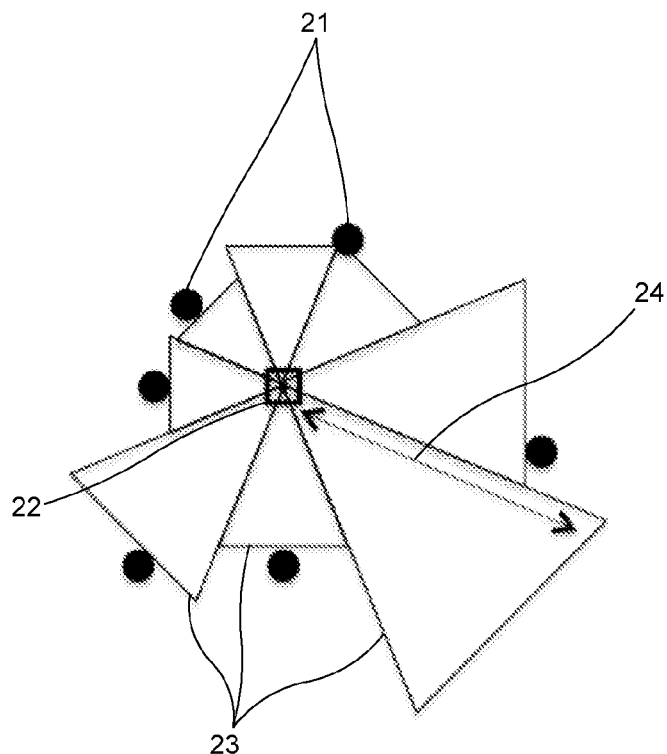
Figure 4C:
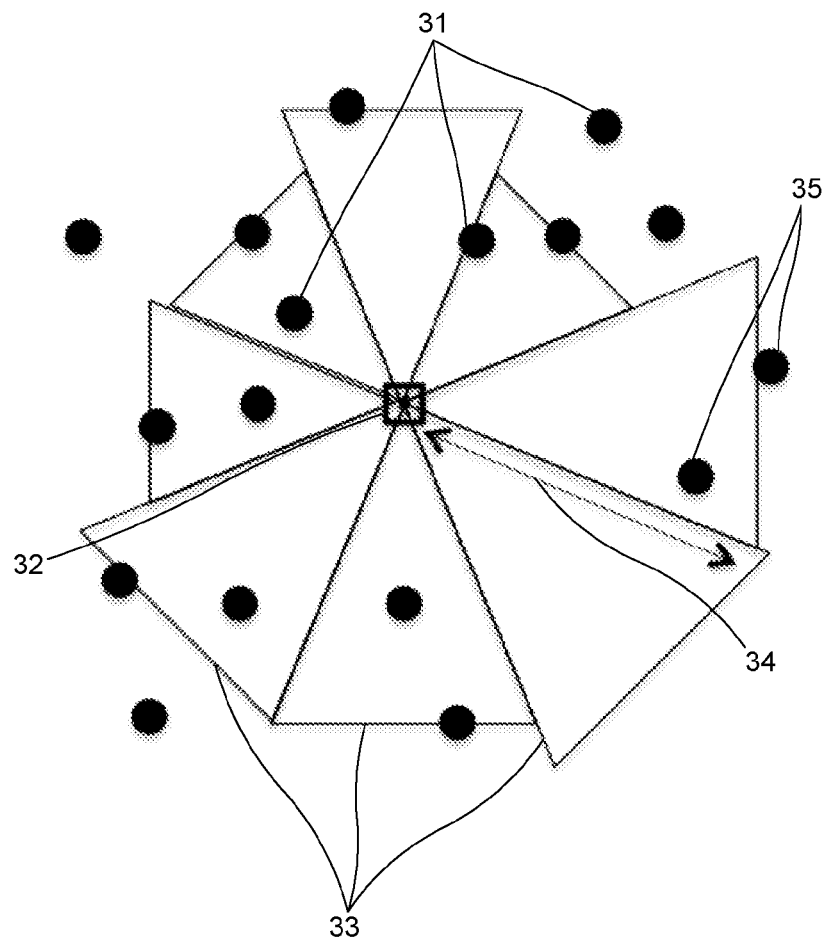

According to a first preferred embodiment, illustrated in FIGS. 4a-4c, the variable geometric structure is such so that it may be defined by an expansion rule by the use of which the geometric structure can expand stepwise from an individual element in relation to which the extension of the geometric structure is determined.

In FIG. 4a, the geometric structure is thus constituted by a circle 13, defined by it being able to expand stepwise from an individual element 12. In the current example, the expansion takes place so that the circle obtains as large a radius 14 as possible, given that said individual element 12 is always comprised in the circle 13 without necessarily being located in the center 15 of the circle 13. The expansion of the circle 13 is limited in that it is only allowed to expand up to a size where it somewhere along its periphery reaches one or several elements 11 whose element property in question fulfills a certain criterion, for example that the element property is non-zero or exceeds a certain predetermined value. For the sake of simplicity, only elements 11 meeting this criterion are illustrated. In FIG. 4a, the circle 13 for which the radius of the circle is maximal is illustrated. In other words, the maximized geometric measure is in this exemplifying case the radius of the structure.

More generally put, the geometric structure comprises a closed geometric figure, which may be a circle but which may also be any other well-defined closed structure. The geometric figure has a certain general shape which, according to a predetermined expansion rule, stepwise may expand by growing while maintaining the certain general shape, whereby the geometric extension of the structure across the dimensions of the dataset is limited by the shape only being allowed to expand up to a size where it somewhere along its periphery reaches individual elements or groups of elements the element properties of which satisfy a certain predetermined criterion.

It is preferred that the shape expands so that the said individual element is always a subset of the structure, which is exemplified above by the element 12 always being within the circle 13.

According to a preferred embodiment, not exemplified in FIG. 4a but in FIG. 4b, the said geometric shape expands by all points along its periphery moving straight out from said individual element. In many applications, it is preferred that the center of the structure is not limited to the element in relation to which the structure is determined, but that the individual element instead only must be a subset of the structure, since this yields a smoother output.

Figure 8:
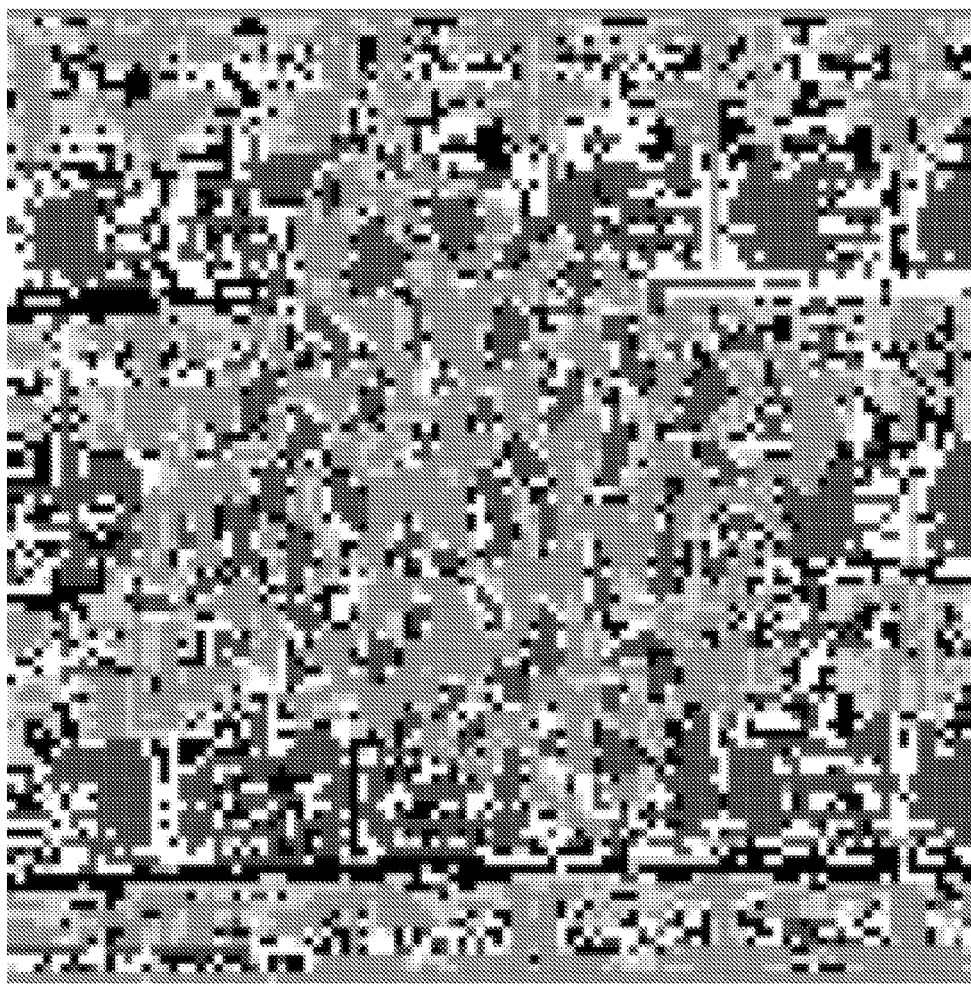
FIG. 8 shows a conventional K-means segmentation over five classes for the image illustrated in FIG. 7.

FIG. 4*b* illustrates, in a way similar to the one in FIG. 4*a*, a second example on the determination of a specific geometric structure. The type of expanding geometric structure illustrated in FIG. 4*b* is conventionally denoted "viewshed". The structure in this case comprises a collection of radial parts 23, which each cover a certain angular area in relation to the individual element 22 in question. Preferably, the angular areas are of equal size, but may also be irregularly distributed over a complete revolution. It is preferred to use at least 4 angular areas, in order to guarantee good results. According to an especially preferred embodiment, as shown in FIG. 4*b*, 8 equally large angular sectors are used. This results in the calculations being particularly simplified, in turn resulting in low demands on the processor(s) of the computer(s). According to another preferred embodiment, a larger number of equally large angular sectors is used, such as at least 50, rather at least 100, angular sectors. This results in high precision and therefore smooth final results.

Each such radial part 23 may, according to the expansion rule, expand in the radial direction independently of the other radial parts, but the expansion for each part 23 is limited by its periphery only being allowed to expand up to an element 21 the element property of which fulfills the said criterion.

In the examples illustrated in FIGS. 4*a* and 4*b*, the geometric structure is limited by it not being allowed to comprise elements fulfilling a certain binary criterion, such as that they are binary associated with the element property in question. In other words, for each element independently of other elements, it may be decided whether the element meets the said criterion or not.

However, in FIG. 4*c*, being similar to FIG. 4*b*, a preferred embodiment is illustrated in which the criterion is not of the said binary type. In a way corresponding to the one in FIG. 4*b*, a number of angular sections 33 are allowed to expand outward from the element 32 in relation to which the determination of the specific structure takes place, and the radial expansion of the angular sections 33 is limited by elements 31. Only elements whose element property in question is non-zero are illustrated, for reasons of clarity.

In contrast to FIG. 4*b*, at least one part of the variable geometric structure is, on the other hand, limited, in the illustrated example at least one angular section 33, by the part not being allowed to comprise a set of elements 35 the collective association of which set with the property in question exceeds a certain predetermined value. Determination of the specific structure may thus be carried out by allowing each angular section 33 to expand radially from the element 32, and each time it reaches another element 31, the total association between the elements 35 reached so far and the element property in question is calculated. In case the total association exceeds a predetermined value, the expansion of the angular section stops.

More generally, at least one part 33 of the geometric structure is limited by the part 33 not being allowed to comprise a set of elements 35 that collectively fulfill a predetermined criterion regarding the association of the element with the property in question.

In both FIGS. 4*b* and 4*c*, the expansion of each angular section 33 is also limited by a maximum radial expansion distance 24, 34, in order to avoid extreme values. This is preferred but not necessary.

Figure 4D:
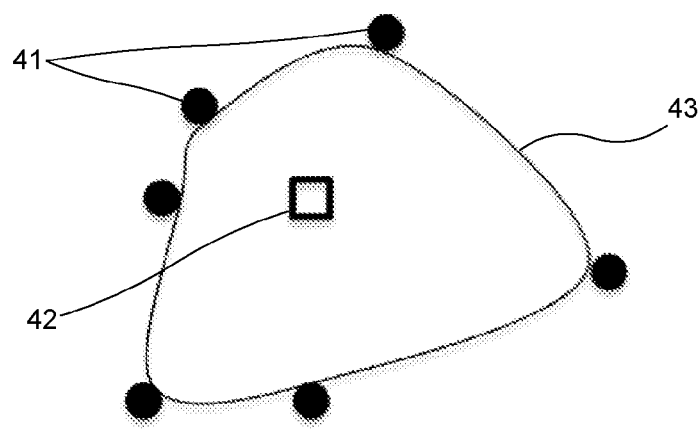

FIG. 4*d* illustrates, in a way similar to FIGS. 4*a*-4*c*, an alternatively preferred strategy to determine a specific geometric structure, in relation to a certain element 42 and while taking other elements 41 into consideration. In this case, the geometric structure comprises a closed geometric FIG. 43 of variable shape. This means that the specific shape itself of the structure is not invariant, but may be changed depending on the positioning of surrounding elements 41 in the local neighborhood of the element 42, depending on the values of the parameters that determine the specific shape. Such a structure is preferred since it gives rise to especially smooth output.

In addition to that the shape 43 is limited by the elements 41 which it reaches and which fulfills a certain criterion regarding the element property in question, or alternatively regarding collective element properties of several elements comprised in the shape 43 as described above, the extension of the shape 43 is limited by a predetermined energy functional regarding the shape 43. Such energy functional may be any suitable functional, such as keeping the surface or circumference of the shape 43 constant or it not being allowed to exceed a certain predetermined value.

One example where it is suitable that the surface of the shape is limited so that it is not allowed to expand above a predetermined value is when the geometric shape is expanded from and in relation to a certain element in a way similar to when a balloon is inflated. In this and other cases, the structure expands according to the expansion rule by, at each given stadium of expansion, only parts of the periphery of the structure being allowed to expand the expansion of which is not currently limited by individual elements or collections of elements meeting the said criterion. In other words, the rest of the elements, in the local neighborhood of the element in relation to which the expansion takes place, act as fixed stops for the expansion. Such a structure allows for a smooth output even in the case of non-convex shapes of limiting elements in the local neighborhood of the element in question.

As opposed to FIGS. 4*a*-4*d*, FIGS. 4*e* and 4*f* show an exemplifying image in two dimensions, where the color of dark elements 51 and light elements 52, respectively, represent a binary value which for instance indicates whether the element in question is associated with a certain class in an initial set of classes, alternatively with a certain other element property.

Figure 4E:
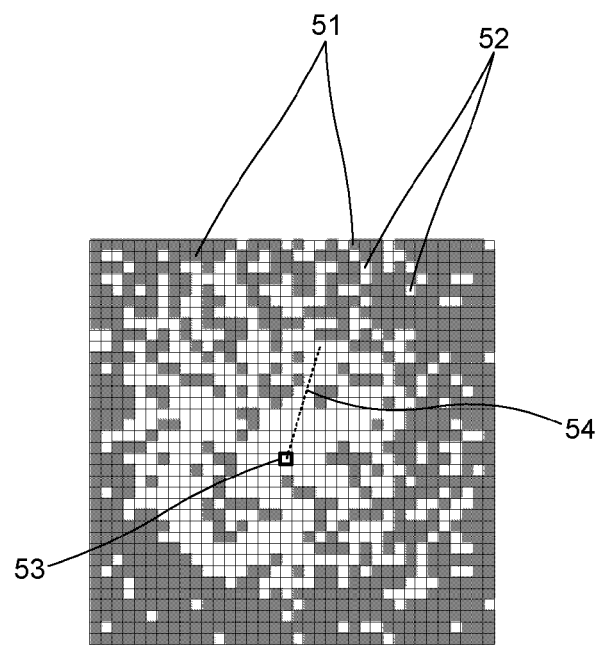

In FIG. 4*e*, a geometric structure is illustrated in the shape of a straight line 54, originating from the element 53 in relation to which the structure is determined, and runs straight out from this element. The specific geometric structure is then determined as the structure which maximizes the measure which is constituted by the length of the line 54. Hence, in this case the specific structure is not determined by expanding the structure stepwise in relation to the element 53. Instead, a suitable algorithm which is conventional as such is used to efficiently determine the longest line which can be inserted into the dataset, which starts in the element 53 and the extension of which is limited to elements 52 of a certain binary value concerning the element property in question. In FIG. 4*e*, the longest possible 54 of such lines which is limited to run across light elements 52 is shown. Such a structure allows calculations with small processor footprint.

More generally, one can say that the variable geometric structure comprises an elongated part, the extension of which in a longitudinal direction is limited by it not being allowed to cross elements the element properties of which fulfill a certain criterion.

Figure 4F:
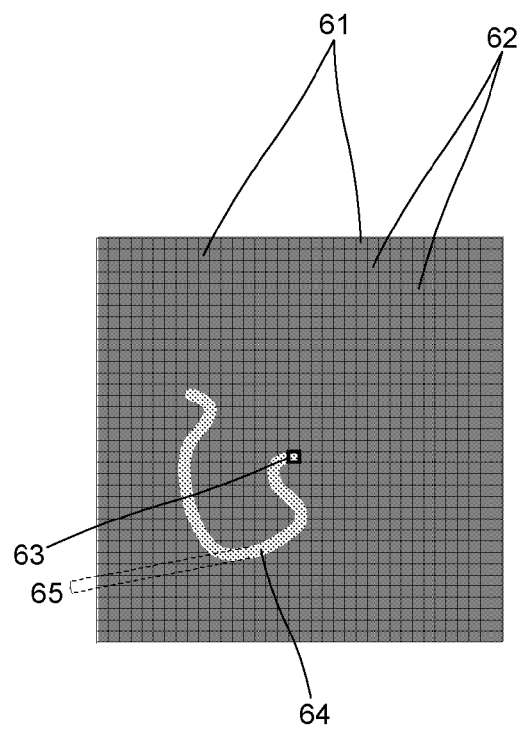

Thus, the structure illustrated in FIG. 4*e* is constituted by a line which is one-dimensional as such and which extends across the two-dimensional image surface. FIG. 4*f* illustrates the same dataset comprising dark 61 and light 62 elements, but an alternative elongated structure 64 extending from a certain element 63 in relation to which the structure 64 is determined.

As is clear from FIG. 4*f*, in this case the elongated part 64 is not straight, but its extension is allowed to describe a bent curve through the image. Moreover, the curve 64 is not onedimensional itself, but constitutes a two-dimensional body with a certain width 65. It is realized that in for example a three-dimensional image, a three-dimensional, elongated body may be used analogously. Such a structure may for example be useful for classifying veins in medical depictions of the human body, or in other types of images in which elongated, hollow structures are relevant.

The specific geometric structure is in this case determined as the elongated body 64, of constant width 65, which is the longest possible, under the prerequisite that the extension of the body 64 from the element 63 is described by a predetermined algorithm and without touching any dark elements 61 in the image.

It is realized that a straight structure of the type illustrated in FIG. 4e may also be arranged with a certain width, as is the case in the structure according to FIG. 4f. In this case, the structure according to FIG. 4e hence becomes two-dimensional rather than one-dimensional.

Secondly, the computer or the interconnected computers are caused to calculate at least one geometric measure for the specific geometric structure determined according to the above. The calculated measure can be the same as or another than the measure being maximized by the established structure itself, but the measure calculated regarding the specific structure in the step 102, and which is then stored in step 103, is of the same general type as the measure being maximized in step 102 by the specific structure. In applicable cases, the above said regarding the maximized measure is also true for the calculated and stored measure.

Moreover, it is preferred that more than one, preferably at least three different, and preferably also invariant, such geometric measures are calculated for each determined specific geometric structure. This will result in that more information can be extracted from the calculated specific structures for all image elements.

Non-limiting examples of suitable measures for calculation comprise, for FIGS. 4a-4d, circumference, surface area and the relative position of the centre of gravity of the structure in relation to the element in relation to which the specific structure has been determined; for FIG. 4d, the degree of circularity and the degree of convexity; for FIGS. 4e-4f, the length; and for FIG. 4f the grade of curvi-linearity.

The same variable geometric structure and the same at least one geometric measure is used for all elements and all element properties processed in step 102.

In the step 103, for all elements processed in the step 102, the computer or interconnected computers are then caused to store in a database an association between each element and the, for the element, at least one calculated geometric measure for each property for which a specific geometric structure has been calculated in the step 102. The database may be constituted by the internal memory of the operating computer, a file on a hard drive or another type of internal or external database.

For each element in the image, specific geometric structures are thus preferably established for several different properties, and for each of these different structures several different geometric measures are preferably calculated. Associations between each element and all these measures are thus stored in the database, so that each element in the database typically is associated with M*x measures, where x is the number of calculated measures per specific structure.

It is preferred that an association between each element and at least two calculated geometric measures are stored in the database. These measures may thus be related to specific geometric structures with respect to different element properties and/or to the same specific geometric structure.

It is especially preferred that a specific geometric structure is caused to be determined for each element and for at least two of the M element properties.

It is realized that the step 103 may be carried out immediately after the step 102 for each individual element, or that the step 103 may be carried out for all elements in succession after that the step 102 has been carried out for all elements in succession, or that steps 102 and 103 are carried out in another way, as long as both steps 102 and 103 are carried out for all elements in the image.

As described above, it is preferred that at least one of the M element properties initially is populated with data representing an association between the element in question and a certain class or a number of certain classes of a first set of classes in a first, initial classification of the dataset.

It is preferred that the computer or the interconnected computers in this case is or are caused to initially carry out such a first classification of the digitally stored dataset, and to store the result from this classification in a first database. In the present exemplifying embodiment, the classification shown in FIG. 3 is stored in the first database. Herein, the result of this classification is denoted "the first classification". The first database may be the same as the above described database or another one. In the latter case, the first database may be of the above described type.

The first classification may be a cluster analysis of K-means type, or any suitable kernel based or window independent classification, as long as the classification is based upon the stored image information of each respective pixel and possibly also upon other, already stored, properties for each respective element. The first classification may be based upon predefined, static classes, a predetermined number of variable classes, or the classes and their definitions may take shape during the classification.

The first classification may also be a supervised or unsupervised classification. A supervised classification consists of two steps. In the first step, representative areas are identified in a representative image, and a numerical description of the properties of the representative areas is achieved. In the second step, the numerical descriptions of representative areas are used as classes in a final classification of an image. In an unsupervised classification, each pixel in a certain image is associated to a certain class, where the properties of all classes are determined during the course of the process, in other words with no previous knowledge about the types of image areas that may occur. According to the invention, it is preferred to use an unsupervised classification, since it can function over a broader spectrum of different images without specific adaptations.

Examples of useful supervised classifications are "Minimum-Distance-to-Means classifier", "Parallelepiped Classifier", "Gaussian Maximum Likelihood Classifier", "K-nearest neighbor" and "Maximum Likelihood classification".

Examples of useful unsupervised classifications are various hierarchal clustering methods, partitional clustering methods, "K-mean" clustering and "Self organizing maps".

Figure 5:
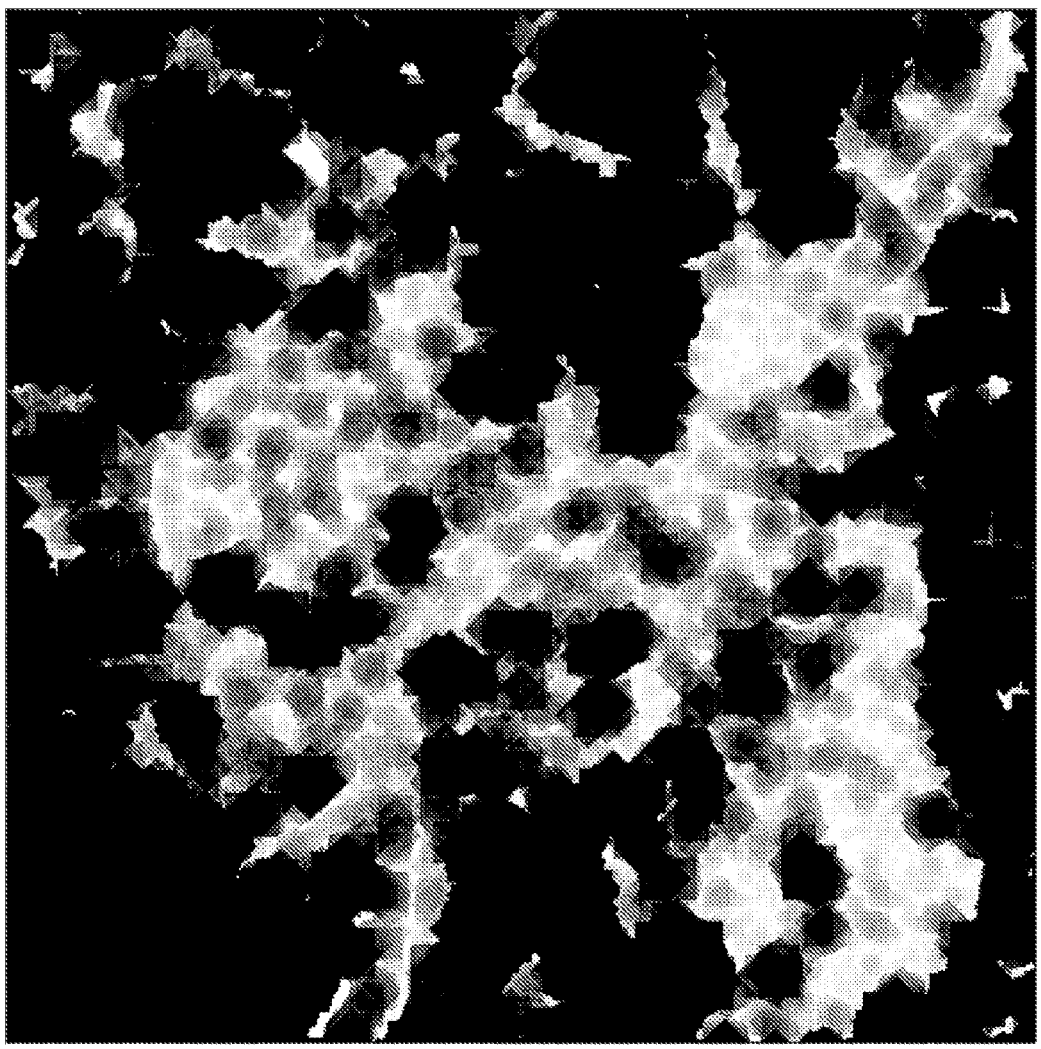
FIG. 5 is a graphical illustration of the distribution of the respective surface of a geometric structure determined according to FIG. 4b for each pixel in the image shown in FIG. 1 and for a certain specific one of the classes illustrated in FIG. 3.

FIG. 5 graphically illustrates the calculated geometric measure "area" for a respective specific geometric structure which is determined in the way illustrated in FIG. 4b, with eight equidistributed angular segments which are expanded out from the element in question and are limited by other elements which are associated with a certain individual class in the classification illustrated in FIG. 3. The calculated area of each specific structure is illustrated using grayscales—the darker the color of the element in FIG. 5, the larger the area of the specific structure determined in relation to the element in question. Black elements represent elements with a highest allowed surface, larger than which the structures have not been allowed to expand.

According to the invention, the computer or computers, in a fourth step 104, thereafter carry out a main classification of the dataset, this time based upon the data being stored in the second database and preferably for and based upon all elements corresponding to pixels in the original image. According to the invention, the relevant metric for this second classification is, for each element, a comparative measure between the respective sets of geometric measures calculated in step 102 of two elements, and the main classification is thus based upon this comparative measure. These calculated measures may thus be constituted by one or several measurement values per element, why it may be necessary to for instance carry out a multidimensional cluster analysis as a part of the second classification. Examples of useful comparative measures comprise the common Euclidian distance, possibly with a scale factor. Non-scalar, per se conventional comparative measures may be used to compare two vectors comprising several different geometric measures, and so on. In the case with vectors, an isotropic or anisotropic scaling may further be carried out on the measurement value vectors before they are compared, such as using a matrix operation.

Suitable types of classifications for the main classification are those mentioned above as suitable for the first classification, and the main classification may be of the same type as or another type than the first classification. However, it is preferred that the main classification is of an unsupervised type. It is furthermore preferred that the main classification is of an unsupervised type irrespective of if any first classification is of a supervised or unsupervised type. Such a method admits automatic and precise classification across a broad spectrum of different original images.

The main classification may also comprise a manual segmentation of the data stored in the database, using a technique for so-called "region-growing", where a user manually selects a point of origin, or "seed".

The outcome of the main classification is thus an association between each respective pixel in the original image and a certain specific class in a main set of classes, which is either predefined or defined during the conduction of the main classification.

Based upon the above described comparative measure, it is also preferred to, before the main classification, reduce the noise in the dataset by forming the average of elements for which the calculated measures correspond. This results in a filtration, or more generally regression, of the dataset, and may serve to improve the result of the main classification.

Thereafter, according to the invention the computer or the interconnected computers store, in a fifth step 105, onto a digital storage medium, the image classified in step 104 in the form of a set of pixels, where each respective pixel is associated with the class in the main set of classes with which the element corresponding to the pixel in the image was associated in the step 105 as described above. The digital storage medium is the same one as that onto which the original image was stored or a different one, and the storage technique can be as described above regarding the original image. The important thing is that the set of pixels, each with an association to a certain specific class, is stored in a way which admits this information to be represented as a classified image, in which the position of each pixel in the classified image corresponds to the position of the pixel in the original image, and in which the value of the respective pixel, such as color intensity in one or several channels, corresponds to the class to which the pixel in question has been associated. As a result, the classified image has the same dimensions regarding the number of pixels as the original image. In subsequent steps, the resolution of the classified image may of course be adjusted.

Figure 6A:
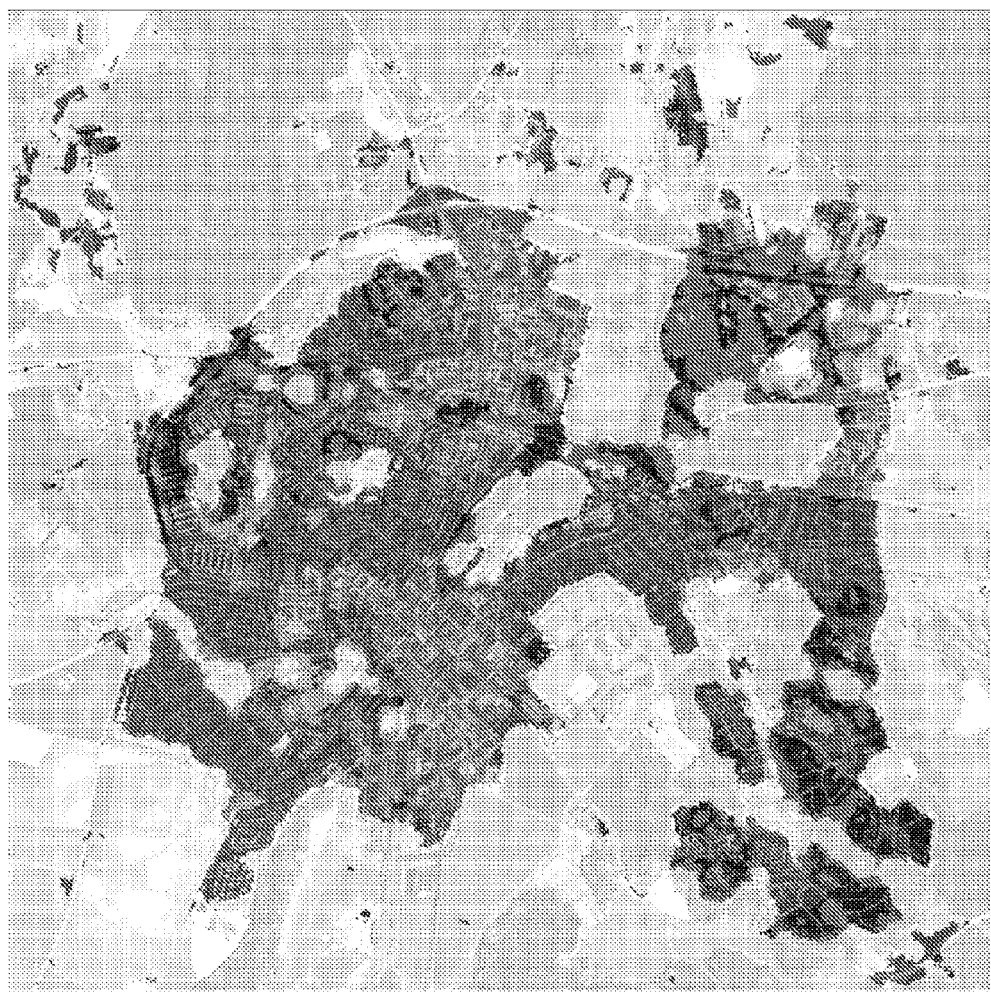
FIGS. 6a and 6b show a main classification according to the invention over two classes for the satellite image illustrated in FIG. 1.
Figure 6B:

FIG. 6a, and FIG. 6b in magnification, illustrates such a finally classified image, based upon the original image shown in FIG. 1 and carried out over ten different main classes. In order to increase the clarity of the figure, these ten classes have been combined into two different collective classes, which two different classes are represented using different shades of gray. Furthermore, the classified image is illustrated against the background of an aerial photography of high resolution over the geographic area illustrated in FIG. 1, so that the extension of the classes is clear. The classification illustrated in FIGS. 6a and 6b is thus based upon the respective largest area of geometric structures according to FIG. 4b for each pixel in the original image and with respect to each one of the classes resulting from the first classification illustrated in FIG. 3.

Figure 7:
FIG. 7 is a second image, in the form a monochromatic image comprising two areas of different texture.

FIG. 7 illustrates another image than the one illustrated in FIG. 1. As is clear from FIG. 7, the image comprises a central area of a different type of texture than that of the rest of the image.

Figure 9:
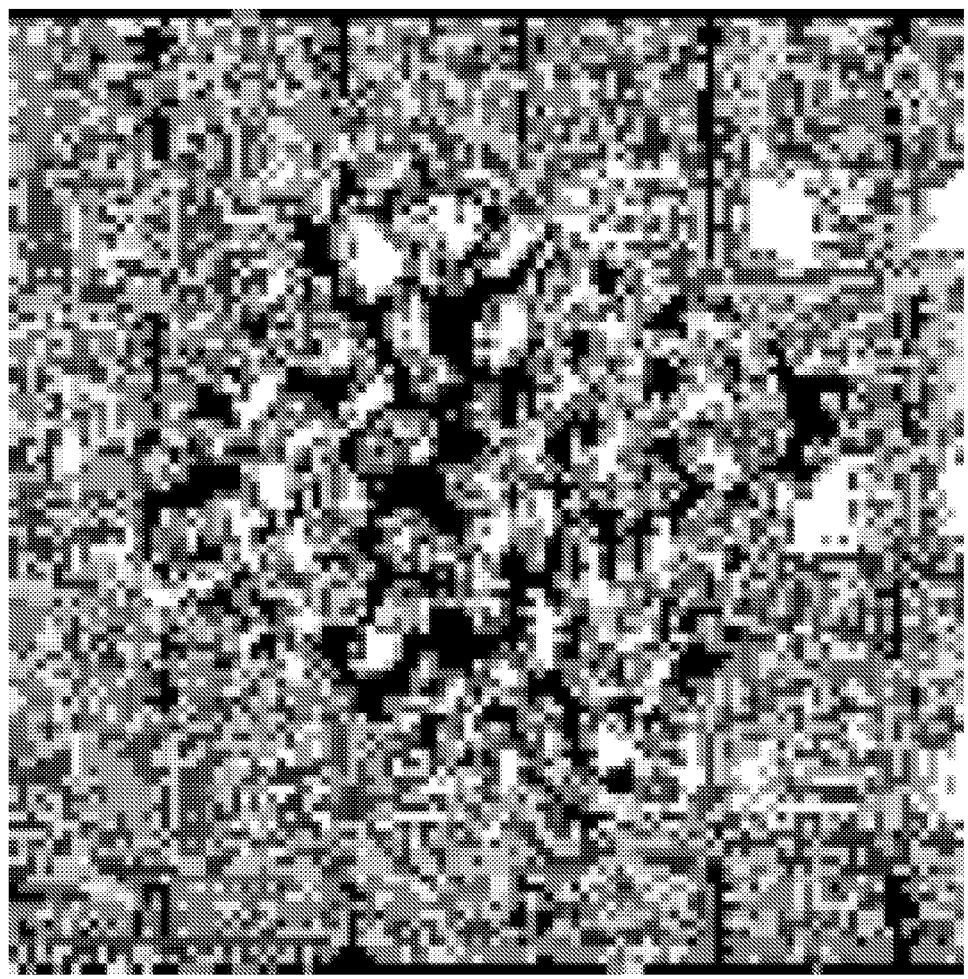
FIG. 9 shows a conventional K-means segmentation over ten classes for the image illustrated in FIG. 7.

FIG. 8 illustrates a naïve segmentation of the image in FIG. 7 using K-means over 5 classes based upon the gray value for the respective pixels in the image. Moreover, FIG. 9 is a segmentation of the image in FIG. 7 using K-means over 10 different classes. It is noted that the separation of the two areas of different texture is defective in both FIG. 8 and in FIG. 9. Not even a manually conducted combination of classes will give rise to a low noise division into areas of different textures.

A two-dimensional dataset was put together, in which the pixels of the two-dimensional image each represented an element in the dataset, and where a ten-dimensional property vector comprising the affiliation of an element to each of the ten classes from the classification illustrated in FIG. 9 was associated with each of the elements in the dataset.

Figure 10:
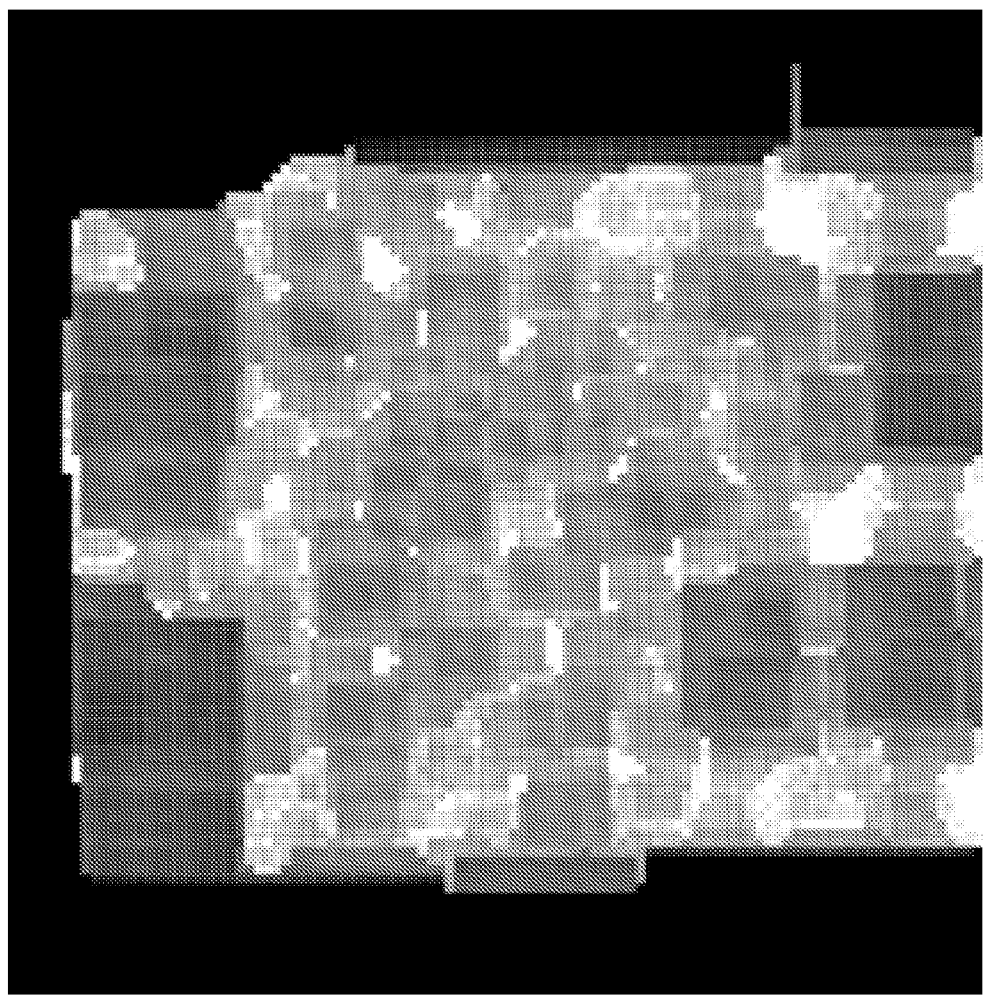
FIG. 10 is a graphical illustration of the distribution of logarithmically scaled respective area for a geometric structure determined according to FIG. 4b for each pixel in the image shown in FIG. 7 and for a certain specific one of the classes illustrated in FIG. 9.

A variable geometric structure was thereafter defined as a viewshed of four equidistributed angular segments that were allowed to expand independently of each other up to the first element which was associated with a certain property, in other words a certain class. Specific geometric structures were determined for each element, which specific geometric structures maximized the geometric measure "total area for all four expanded parts". A geometric measure in the form of the logarithm of the total structure area was calculated for each specific geometric structure. FIG. 10 illustrates the thus calculated measure with respect to a certain one of the classes illustrated in FIG. 9, in which black color means large or a predetermined maximal area, and successively lighter shades of gray mean successively smaller areas.

Figure 11:
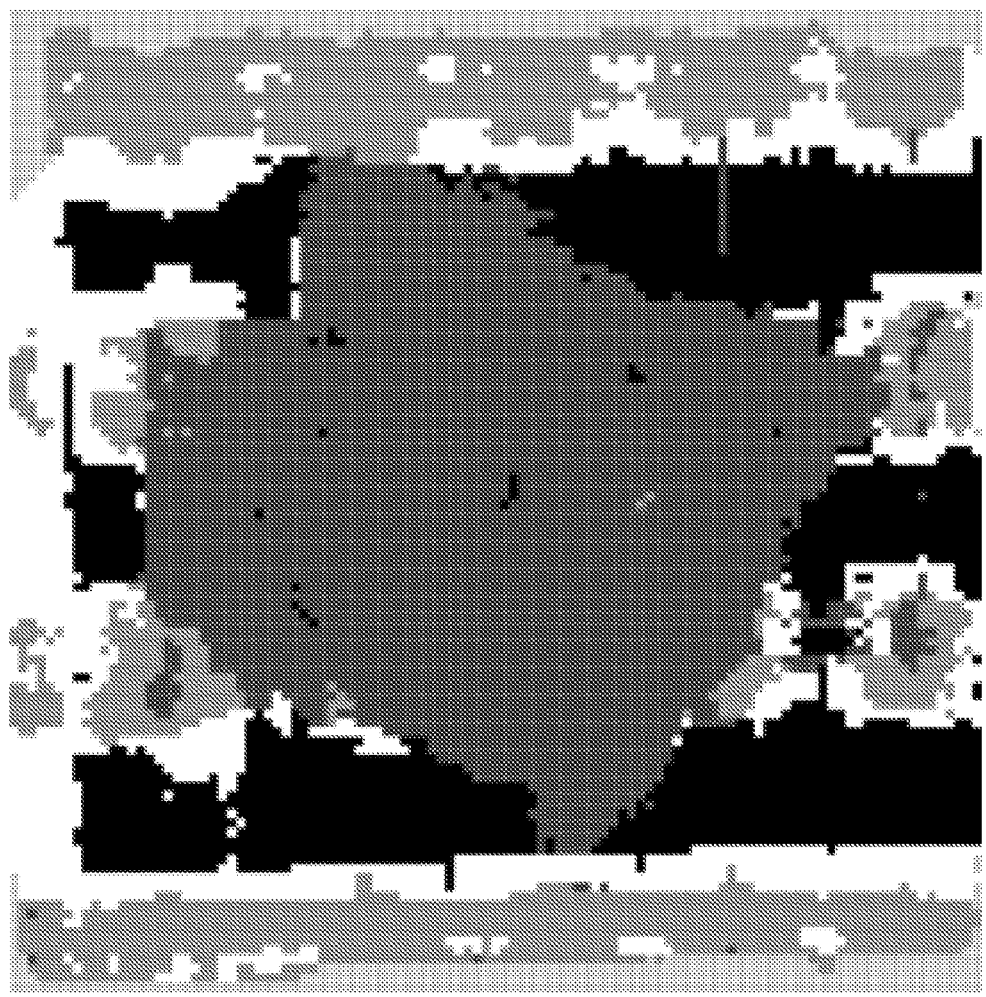
FIG. 11 shows a first main classification according to the invention over five classes for the satellite image illustrated in FIG. 7.

A respective association between each element in the image and each of the ten calculated measures per element were stored in a database, after which a main classification was conducted based upon these data. The main classification was a K-means classification over five classes. FIG. 11 illustrates the result. As is clear from FIG. 11, this algorithm discriminates between the different areas of different texture, with comparatively low noise. It is noted that some disturbing artifacts are present in the classified image, as a consequence of the fact that only four expansion directions were used in the determination of specific geometric structures.

Figure 12:
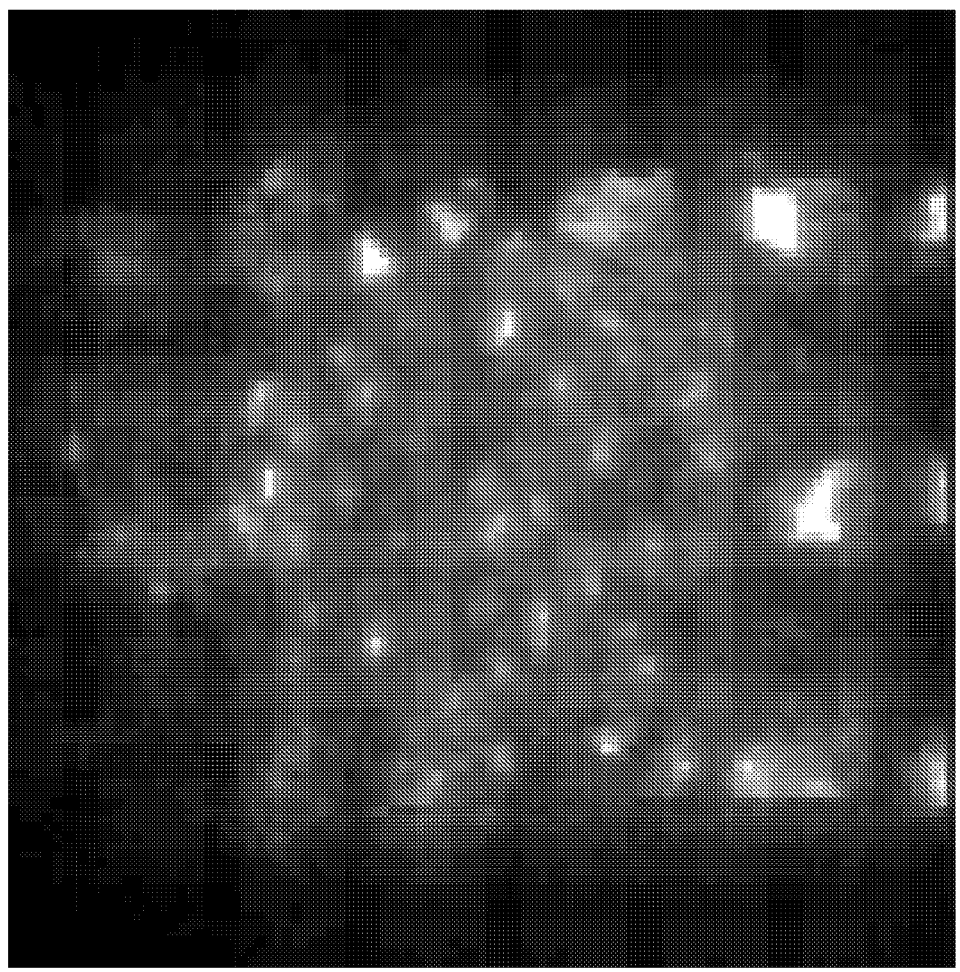
FIG. 12 is a graphical illustration of the distribution of the respective surface for a geometric structure determined in a way similar to the one according to FIG. 4b for each pixel in the image shown in FIG. 7 and for a certain specific one of the classes illustrated in FIG. 9.

FIG. 12 illustrates, in a way corresponding to that of FIG. 10, a calculated geometric measure with respect to a certain one of the classes illustrated in FIG. 9, but where another variable geometric structure has been used. This structure comprised thirty-six one-dimensional, straight lines, which were allowed to expand independently of each other in evenly distributed directions up to a respective point at which they hit upon an element associated with a certain respective one of the classes illustrated in FIG. 9. The maximized geometric measure was the length of each of the lines. The calculated geometric measure for the specific geometric structure was the total area of the two-dimensional polygon constructed from the outer end points of the expanded lines.

Figure 13:
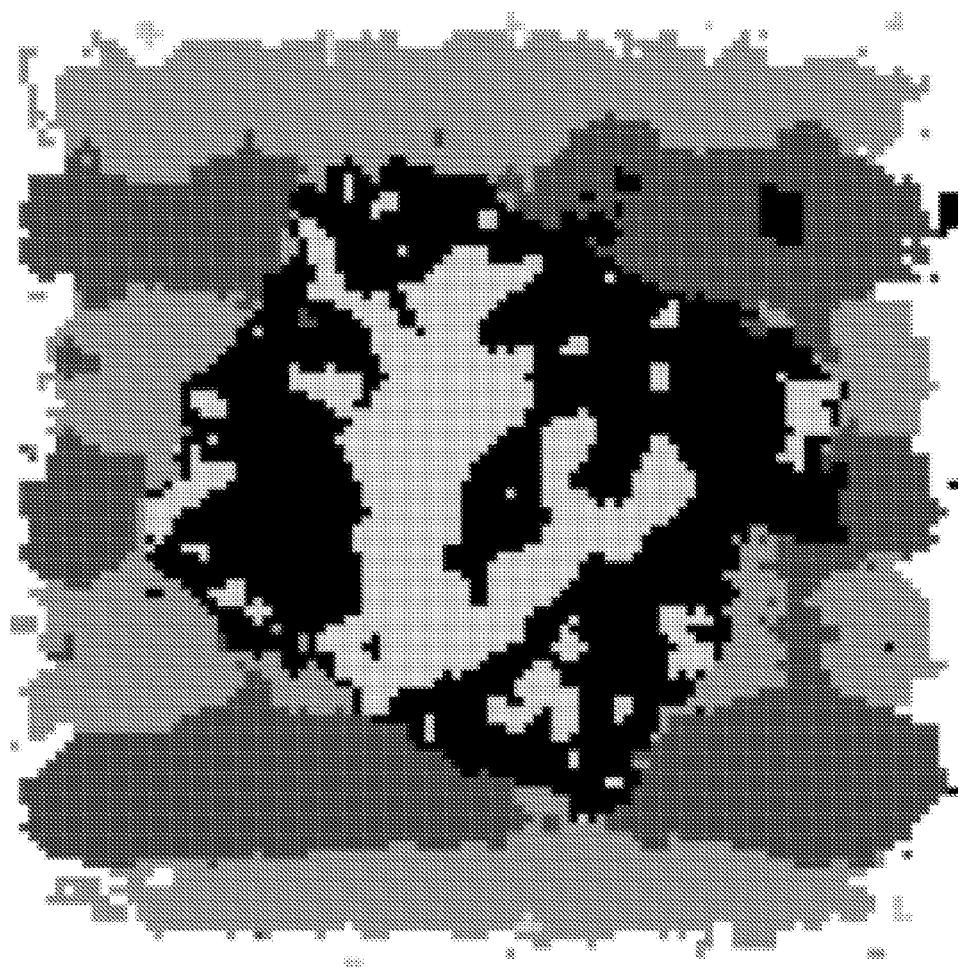
FIG. 13 shows a second main classification according to the invention over five classes for the satellite image illustrated in FIG. 7.

FIG. 13 shows the result after a main classification, over 5 classes using K-means, of the result after calculation of such geometric measures for all elements and all ten classes shown in FIG. 9. Clearly, the result was satisfactory, especially if the two classes describing the inner texture were combined.

It is noted that a similar final result was obtained if a viewshed with 360 equidistributed angular parts was selected as variable geometric structure, which indicates that thirty-six different expansion directions are sufficient to achieve good results with the type of images exemplified by FIG. 7. It has proved that for many applications, about ten different, equidistributed directions or more are sufficient to obtain good results. If about ten directions are used, the demands on computer power are also limited.

Figure 14:
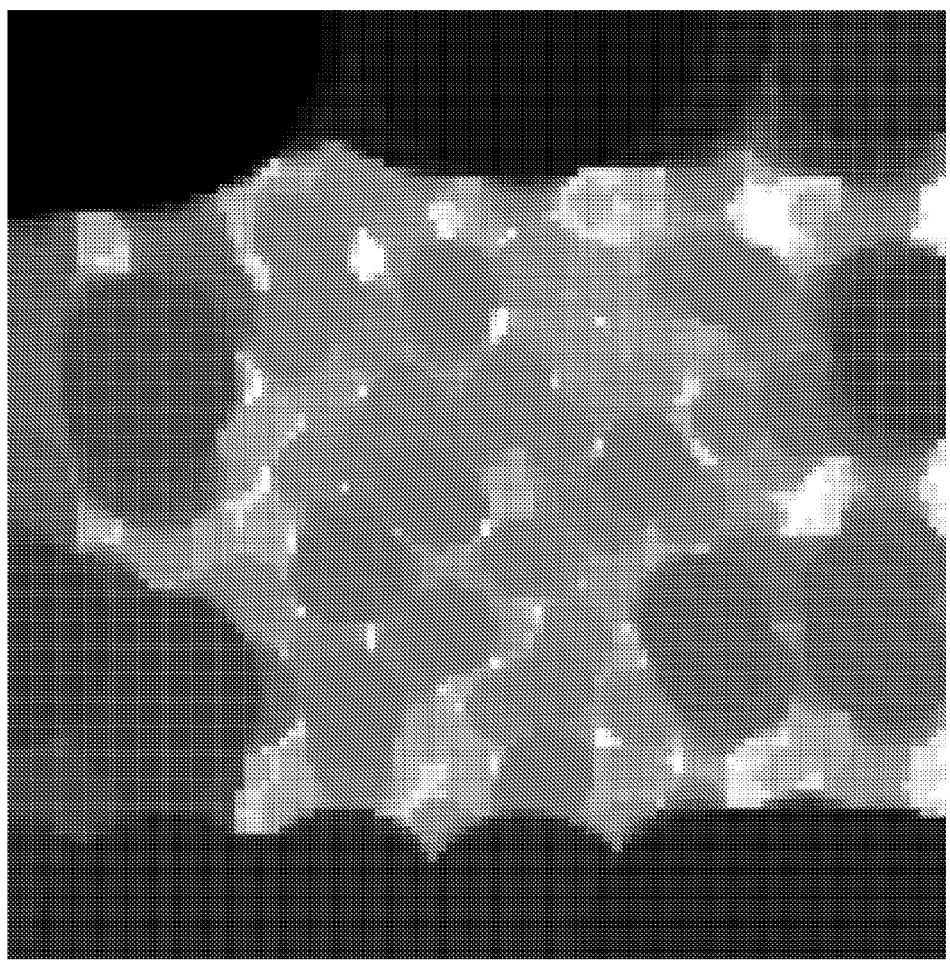
FIG. 14 is a graphical illustration of the distribution of the respective area for a geometric structure determined according to FIG. 4a for each pixel in the image shown in FIG. 7 and for a certain specific one of the classes illustrated in FIG. 9.
Figure 15:
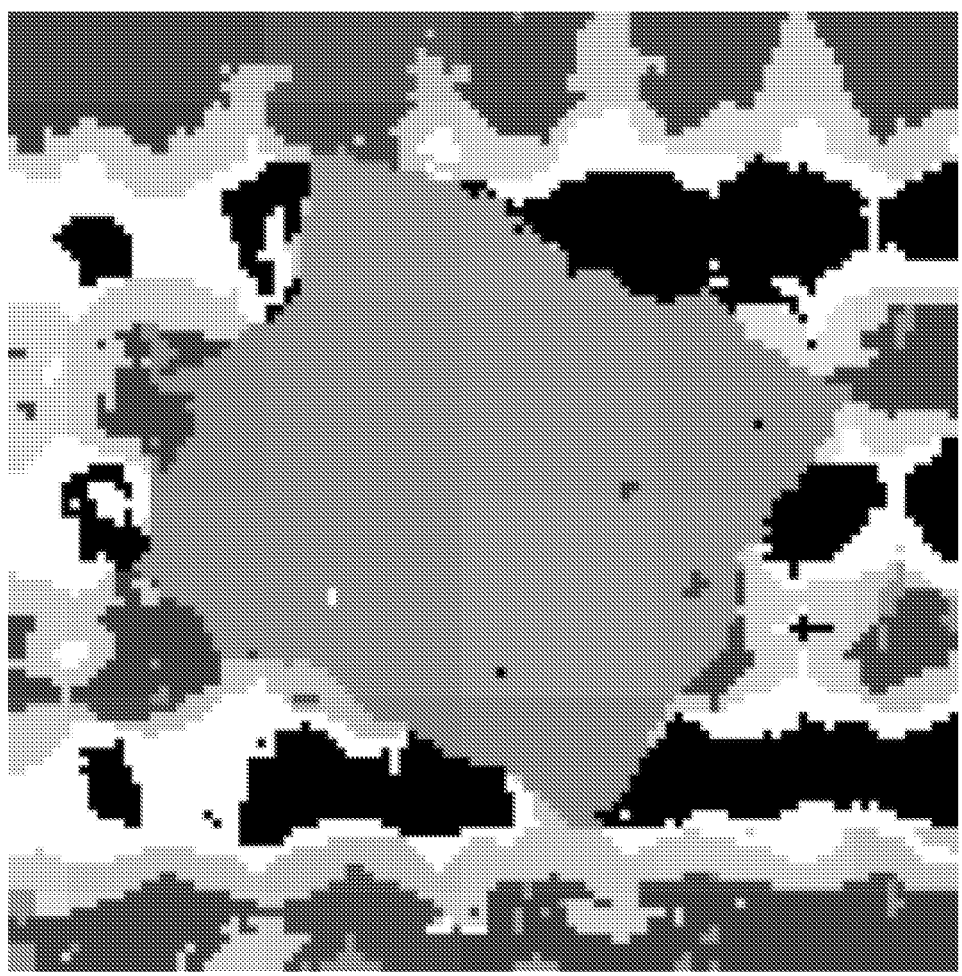
FIG. 15 shows a third main classification according to the invention over five classes for the satellite image illustrated in FIG. 7.

FIGS. 14 and 15 are similar to FIGS. 10 and 11, and 12 and 13, respectively, but here expanding, non-centralized circles of the type described above in connection to FIG. 4a were selected as variable geometric structure. From the final result in FIG. 15, it is clear that this method according to the present invention achieves a very good separation of the two different types of texture in the original image in FIG. 7.

A method according to the present invention, in which an organization of image- and other data in a dataset of the above described type, comprising elements with respective element properties, is followed by a calculation of at least one respective geometric measure of a respective specific geometric structure for each respective element in the dataset and with respect to one or several element properties, and is then followed by a main classification based upon these calculated measures, solves the above described problems.

Depending on the concrete application, the geometric measures may be selected so that they serve to estimate the density for a certain element property in a local neighborhood to a certain element. The main classification may thereafter achieve very sharp class boundaries. This is an effect of that the variable geometric structures may be selected so that the specific structures for two elements which are close one to the other often are very similar or exactly the same, yielding virtually constant property values in part-wise areas of the finally classified image.

As illustrative examples, one may imagine that two expanding geometric structures of the type illustrated in FIG. 4b are surrounded by a certain element property, represented by elements in a ring around the two elements in relation to which the structures expand. If this area is approximately convex, the expanding sectors will cover the same area for all elements inside the convex area. This will result, if disregarding numerical effects such as that only a finite number of sectors are expanded from each pixel, in that a measurement value such as the total sector area will be the same for all elements in the area. Thereby, all pixels in this area will also be classified in a similar way in the main classification step 104.

The exact choices of variable geometric structure, type of measure to be maximized in a specific structure, type of limitation with respect to properties of surrounding elements and type of measure to be calculated depends on the actual purposes and prerequisites, and are determined from case to case. The principles described herein are, however, the same irrespective of these choices.

Thus, the probability for closely positioned pixels to be associated with the same final class will be comparatively large. Similarly, the probability will be small for a pixel, which is similar to a group of pixels which in the final classification falls in a certain class but is geometrically isolated from these other pixels in the image, will fall in the same class. In other words, a method according to the present invention will have a strong tendency to group pixels located closely together in the same class, and thereby create connected areas of pixels associated with one and the same class. These effects result in low scattering in the finally classified image.

On the other hand, the calculated geometric measures will change rapidly between closely located pixels in case the element properties are locally changed rapidly in an area of the image. This will result in that a method according to the present invention with relatively high precision will produce a final classification in which borders between the final classes really represent relevant borders and transitions in the original image.

A method according to the present invention may be designed so that it yields better results than a method according to the above referred Swedish patent application no 0950140-4, since a geometric measure according to the above in general constitutes a more stable and low-noise estimation of the local property density than only a smallest distance to a certain class.

In summary, the above described method may be used for, automatically and without extensive previous knowledge about the contents of a certain image, obtain a relevant classification with low scattering. In particular, this is the case (sic!)

According to a preferred embodiment, in the step 102 for each element at least one geometric measure is calculated for a specific geometric structure with respect to each of all the element properties in the dataset, and all calculated measures are also used in this case in the main classification. This will maximize the use of the information contained in the original image, and any additional information of spatial character.

According to a preferred embodiment, the first classification comprises a classification using a K-means cluster analysis followed by a classification using a maximum likelihood cluster analysis, in which the result from the K-means classification is used as a starting point. According to a further preferred embodiment, the main classification comprises a K-means cluster analysis. The present inventors have discovered that such a method yields good end results.

Moreover, the present inventors have obtained good results in case the number of classes in the first classification is either set beforehand to between 20 and 100, or when the first classification uses a variable number of classes, and where the classification in this case is adjusted so that the resulting number of classes is between 20 and 100. According to an especially preferred embodiment, the so-called Akaike information criterion is used in order to decide an optimal number of classes in the first classification, by balancing the complexity of the model to the variance within each class. In other words, the number of classes is selected so that an Akaike information criterion is maximized for the classification for this choice of number of classes. See Akaike H., "A new look at the statistical model identification", IEEE Trans. Automat. Contr. AC-19:716-23, 1974 [Institute of Statistical Mathematics, Minato-ku, Tokyo, Japan].

Correspondingly, it has been found that a suitable number of classes in the main classification is between 5 and 20, especially when a first classification is conducted and the number of classes in this is between 20 and 100. Depending on the detailed application, such a number of classes namely in general yields a finally classified image with relevant classification of individual pixels and with limited noise in most classes. The choice of number of classes in the main classification depends, on the one hand, on the type of result desired from the method according to the present invention, and on the other hand on if additional processing of the achieved classification is to be performed in later steps. It is especially preferred to use the Akaike criterion to decide the number of classes also in the main classification, in a way corresponding to the one described above.

Furthermore, all scalar variables handled in the different steps of the method may be transformed by a non-linear transformation, such as $x^2$ or $x^{1/2}$, before they are used in calculations or comparisons. For example, if the square root of length measures is used, this may lead to relatively decreased weight to very long structures.

As discussed above, a method according to the present invention can advantageously be used to automatically achieve a relevant classification of two-dimensional images, especially for photographical images. Classification of such photographic images containing image information in one channel, such as grayscale light intensity, has been found to yield high quality results. A method according to the present invention is also very useful in the case with photographic images with image information in three or more channels, such as for example color intensity information according to some conventional color system using three channels, such as RGB, Lab, YUV, HSV or NCS, or a representation where several different channels represent color intensity over different wavelength intervals. The latter type of color information models are for example used in satellite imaging, and in that case often use four or more channels for different wavelengths.

Starting out from such a two-dimensional photographic satellite image, a method according to the present invention can thus be used, for instance as an automatic tool for map construction, demographical or geographical investigations, environmental analyses, etc. In the case with other types of two-dimensional photographical images, a method according to the present invention can be used as a part of a system for example for computer vision, visual inspection of manufactured details or of intermediate goods or raw materials, help systems for photography in order to automatically be able to identify different objects and/or to find suitable focus points, digital image processing, remote reading, microscopy, digital image analysis and -processing and so on.

It is further realized that a method according to the present invention is useful for automatically classifying three-dimensional images, especially, and as discussed above, regarding three-dimensional images representing the tissue structure in humans and animals within the medical and veterinary fields. Such three-dimensional images actually constitute three-dimensional depictions of three-dimensional objects, where each pixel comprises image information concerning the value for one or several material properties at the position in the object which corresponds to the pixel in question. The material properties can for example be material density and/or the presence of a marker substance. It is usual that such images only contain image information in one channel. Automatically segmented three-dimensional depictions can especially advantageously be used to analyze the human body, as a support for surgeons during surgery and to analyze three-dimensional depictions within the micro- and nanotechnological fields. In particular in medical applications, it is useful to apply a method according to the present invention on an image comprising one or several temporal dimensions as described above.

According to a preferred embodiment, the computer or computers furthermore initially conduct a kernel based processing of the original image, and the result from this is appended to the dataset as one of the element properties of all elements. One example of this is that a value for each pixel is calculated for the texture in a limited area around the pixel in question, for example a 9×9 matrix with the pixel in question in the center, and that this calculated value is then caused to constitute one of the M element properties for the element in question. This way, in certain applications the precision of the final classification may be improved.

According to the invention, the variable geometric structure, the geometric measure and the criterion for element properties used to determine how a structure is limited are not selected so that the geometric measure calculated in step 102 merely constitutes a measure of the smallest distance between the element in question and the closest element being associated with the element property in question.

Above, preferred embodiments have been described. However, it is apparent to the skilled person than many modifications may be made to the described embodiments without departing from the idea of the invention.

For example, the present method may be performed iteratively. In other words, after a first classification, calculation of geometric measures and a main classification, an additional calculation may be made of geometric measures for specific geometric structures determined with respect to one or several of the classes resulting from the said main classification, and thereafter an additional main classification may be conducted based upon these calculated measures. The latter calculation of measures and the classification may be varied within the scope of what has been described above for such a calculation and for the main classification. For certain applications, such a classification may in several iterative steps yield even better results.

Thus, the invention shall not be limited by the described embodiments, but be variable within the scope of the enclosed claims.

The invention claimed is:

1. Method for classifying an image in two or more dimensions, where an N-dimensional dataset comprising elements is caused to represent the image by at least two of the N dimensions constituting respective image axes, so that a certain pixel in the image corresponds to a certain element in the dataset, and by each element being associated with M numerical values each representing a measure of a property of the element in question, whereof at least one property represents image information in one respective sampled channel, characterized in that the method comprises identifying firstly a certain predetermined, variable geometric structure, the extension of which in at least two of the N dimensions in the dataset is determined in relation to a single element in the dataset and by at least one variable parameter, and secondly at least one geometric measure associated with said variable geometric structure, which geometric measure is arranged to measure a geometric property of a specific geometric structure in relation to other specific such geometric structures, and in that the method also comprises the steps that a computer or several interconnected computers a) is or are caused to store the dataset on a digital storage medium (101);

b) for at least each element that corresponds to a pixel in the image, and for at least one of the M element properties, firstly is or are caused to determine a specific geometric structure (13;23;33;43;54;64) which may be obtained in relation to the element (12;22;32;42;53;63) in question and by choices of parameter value or values, for which specific geometric structure at least one of the said geometric measures is maximal at the same time as it is geometrically limited by individual elements or groups of elements the element property in question of which fulfills a certain predetermined criterion, and secondly is or are caused to calculate at least one of said geometric measures for the said specific geometric structure (102);

c) in a database is or are caused to store an association between each element and the at least one calculated geometric measure for the element for each property for which a specific geometric structure has been calculated in the step b) (103);

d) is or are caused to carry out a main classification of the dataset, which main classification is caused to be based upon a comparative measure between the respective sets of associated geometric measures of two elements, whereby each element is caused to be associated with a certain class in a main set of classes; (104) and e) on a digital storage medium is or are caused to store the image classified in the step d) in the form of a set of pixels with the same dimensions as the image, where each pixel is associated with the class in the main set of classes with which the element corresponding to the pixel in the image has been associated in the step d) (105);

and in that the said variable geometric structure, measure and criterion are not selected so that the measure calculated in the step b) only constitutes a measure of the smallest distance between the element in question and the closest element which is associated with the element property in question.

2. Method according to claim 1, characterized in that the variable geometric measure is invariant under scaling of the image.

3. Method according to claim 1, characterized in that, in step c), an association between each element and at least two calculated geometric measures are caused to be stored in the database.

4. Method according to claim 3, characterized in that, in step b), a specific geometric structure is determined for each element and for at least two of the M element properties.

5. Method according to claim 1, characterized in that the variable geometric structure (13;23;33) is caused to be identifiable by an expansion rule by the use of which the geometric structure can be expanded stepwise from an individual element (12;22;32) in relation to which the extension of the geometric structure is determined.

6. Method according to claim 5, characterized in that the geometric structure (43) comprises a closed geometric figure of a certain general shape, which according to the expansion rule expands by growing while keeping its certain general shape, whereby the geometric extension of the structure in the dimensions of the dataset is limited by the shape only being allowed to expand until it somewhere along its periphery reaches element or elements the element property of which fulfills the said criterion.

7. Method according to claim 5, characterized in that the structure (23;33) comprises a collection of radial parts, each covering a certain angular area in relation to the said individual element (22;32), in that each radial part according to the expansion rule can expand independently of the other radial parts, and in that the expansion of each radial part is limited by its periphery only being allowed to expand up to element or elements the element properties of which fulfill the said criterion.

8. Method according to claim 5, characterized in that the structure (12;22;32) according to the expansion rule expands by, at each given stadium of expansion, only parts of the periphery of the structure the expansion of which is not presently limited by element or elements fulfilling the said criterion being allowed to expand.

9. Method according to claim 1, characterized in that the structure (54;64) comprises an elongated part, the extension of which in an elongated direction is limited by it not being allowed to cross element or elements the element properties of which fulfill the said criterion.

10. Method according to claim 9, characterized in that the extension of the elongated part is allowed to describe a curvilinear path through the image.

11. Method according to claim 1, characterized in that a first, initial classification of the dataset is conducted before step b) is carried out, during which initial classification elements are associated with classes in a first set of classes, and in that one or several element properties for each element is or are caused to represent these associations so that the possible association to one or several classes in the first set of classes of each element can be read out from the dataset.

12. Method according to claim 11, characterized in that the first classification is of an unsupervised type.

13. Method according to claim 1, characterized in that the image comprises a two-dimensional photographic image, and in that each element comprises image information in at least one channel, each indicating light intensity for a certain wavelength spectrum.

14. Method according to claim 1, characterized in that the geometric measure or measures are based upon maximum radius, length, circumference, area, surface area, volume, level of convexity, central moment, center point, center point of gravity and/or the level of circularity or globularity of the specific geometric structure.

15. Method according to claim 1, characterized in that, in step b), the variable geometric structure is limited by not allowing it to comprise element or elements which is or are binary associated with the property in question.

16. Method according to claim 1, characterized in that, in step b), at least one part of the variable geometric structure is limited by the part not being allowed to comprise a set of elements, comprising at least one element, which collectively fulfill a predetermined criterion regarding the association of the element or elements in question with the property in question.

* * * * *